US010190883B2

(12) United States Patent
Buchholz et al.

(10) Patent No.: US 10,190,883 B2
(45) Date of Patent: Jan. 29, 2019

(54) METHOD AND DEVICE FOR SUPPORTING A DRIVER OF A VEHICLE

(71) Applicant: AUDI AG, Ingolstadt (DE)

(72) Inventors: Jan Buchholz, Ergolding (DE); Sebastian Engel, Ingolstadt (DE); Björn Hohlstein, Ingolstadt (DE)

(73) Assignee: Audi AG, Ingolstadt (DE)

( * ) Notice: Subject to any disclaimer, the term of this patent is extended or adjusted under 35 U.S.C. 154(b) by 174 days.

(21) Appl. No.: 15/216,211

(22) Filed: Jul. 21, 2016

(65) Prior Publication Data

US 2017/0023373 A1 Jan. 26, 2017

(30) Foreign Application Priority Data

Jul. 22, 2015 (DE) .................. 10 2015 009 465

(51) Int. Cl.
*G06F 19/00* (2018.01)
*G06G 7/70* (2006.01)
(Continued)

(52) U.S. Cl.
CPC ...... *G01C 21/3469* (2013.01); *B60L 11/1824* (2013.01); *B60L 11/1861* (2013.01);
(Continued)

(58) Field of Classification Search
None
See application file for complete search history.

(56) References Cited

U.S. PATENT DOCUMENTS

| 2011/0098877 A1 | 4/2011 | Staehlin |
| 2012/0158229 A1 | 6/2012 | Schaefer |

(Continued)

FOREIGN PATENT DOCUMENTS

| CN | 1759023 A | 4/2006 |
| CN | 1952603 A | 4/2007 |

(Continued)

OTHER PUBLICATIONS

European Search Report issued by European Patent Office in counterpart European Patent Application No. EP 16 00 1001 dated Dec. 8, 2016.
English translation of European Search Report issued by European Patent Office in counterpart European Patent Application No. EP 16 00 1001 dated Dec. 8, 2016.

(Continued)

*Primary Examiner* — Anne M Antonucci
*Assistant Examiner* — Kenny A. Taveras
(74) *Attorney, Agent, or Firm* — Henry M. Feiereisen LLC

(57) ABSTRACT

A method for supporting a driver of a vehicle, in particular a motor vehicle, includes automatically detecting with a navigation device of the vehicle whether the vehicle has deviated from a defined driving route determined by the navigation device. When the vehicle has deviated from the defined driving route, it is determined with the navigation device whether an amount of propulsion energy stored in an energy storage device of the vehicle is sufficient to still reach at least one energy refilling station. When an energy refilling station can no longer be reached with the vehicle automatically a phone connection with a vehicle external help center is established with a phone device of the vehicle, prior to the vehicle becoming stranded, or it is automatically displayed to the driver with a display device of the vehicle prior to the vehicle becoming stranded, to establish a phone connection with a vehicle external help central.

18 Claims, 6 Drawing Sheets

(51) Int. Cl.
*G06G 7/76* (2006.01)
*G01C 21/34* (2006.01)
*B60L 11/18* (2006.01)
*G01C 21/36* (2006.01)
*B60Q 9/00* (2006.01)
*G08G 1/0967* (2006.01)
*H04M 3/42* (2006.01)

(52) U.S. Cl.
CPC ............ *B60Q 9/00* (2013.01); *G01C 21/3415* (2013.01); *G01C 21/3697* (2013.01); *G08G 1/096791* (2013.01); *H04M 3/42357* (2013.01); *B60L 2240/70* (2013.01); *B60L 2250/10* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/12* (2013.01); *Y02T 90/121* (2013.01); *Y02T 90/14* (2013.01); *Y02T 90/16* (2013.01); *Y02T 90/161* (2013.01)

(56) References Cited

U.S. PATENT DOCUMENTS

| | | | |
|---|---|---|---|
| 2012/0283899 A1* | 11/2012 | Miyamoto | G01C 21/3407 701/22 |
| 2013/0124071 A1 | 5/2013 | Engel | |
| 2013/0124083 A1 | 5/2013 | Engel | |
| 2013/0226443 A1* | 8/2013 | Scofield | B60R 16/0232 701/123 |
| 2013/0342310 A1 | 12/2013 | Park et al. | |
| 2014/0104077 A1 | 4/2014 | Botsch | |
| 2014/0172189 A1 | 6/2014 | Engel | |
| 2015/0051778 A1* | 2/2015 | Mueller | B60W 50/029 701/23 |

FOREIGN PATENT DOCUMENTS

| | | |
|---|---|---|
| CN | 102207393 A | 10/2011 |
| CN | 103175533 A | 6/2013 |
| DE | 101 05 175 | 8/2002 |
| DE | 101 46 789 | 4/2003 |
| DE | 102006034408 A1 | 1/2008 |
| DE | 102008005327 | 7/2008 |
| DE | 102008061304 A1 | 7/2009 |
| DE | 102009016869 | 10/2010 |
| DE | 102012019056 A1 | 3/2013 |
| DE | 102011115854 A1 | 4/2013 |
| DE | 102012003292 | 6/2013 |
| DE | 102013203794 A1 | 9/2014 |

OTHER PUBLICATIONS

Chinese Search Report dated Sep. 11, 2018 by the Chinese Patent Office in counterpart Chinese Patent Application No. 2016105792256.
English translation of Chinese Search Report dated Sep. 11, 2018 by the Chinese Patent Office in counterpart Chinese Patent Application No. 2016105792256.

* cited by examiner

METHOD AND DEVICE FOR SUPPORTING A DRIVER OF A VEHICLE

CROSS-REFERENCES TO RELATED APPLICATIONS

This application claims the priority of German Patent Application, Serial No. 10 2015 009 465.3, filed Jul. 22, 2015, pursuant to 35 U.S.C. 119(a)-(d), the content of which is incorporated herein by reference in its entirety, as if fully set forth herein.

BACKGROUND OF THE INVENTION

The present invention relates to a method for supporting a driver of a vehicle, in particular a motor vehicle.

The following discussion of related art is provided to assist the reader in understanding the advantages of the invention, and is not to be construed as an admission that this related art is prior art to this invention.

It is known to provide vehicles with a navigation system or a navigation device that can guide the driver from a starting point to a destination via a defined driving route. The navigation device can hereby for example be fixedly integrated in the vehicle or may be configured as a mobile or retrofittable navigation device.

It is also known to provide a function in the navigation device by means of which, based on information regarding the average fuel consumption of the vehicle and the fuel amount stored in the fuel tank, a driving range of the vehicle can first be determined or estimated. This determined driving range of the vehicle is then taken into account when determining a driving route so that when driving on the driving route at least one fuel station can still be reached with the vehicle. This reliably prevents the vehicle from becoming stranded. A function is also known in which the driver is automatically or autonomously warned by means of a warning device of the vehicle when the next fuel station on the driving route of the vehicle has to be driven to in order to prevent the vehicle from becoming stranded.

However, problems may arise when the driver does not follow the instructions of the navigation device. When the driver deviates from the predetermined driving route, it may often no longer be possible to prevent the vehicle from becoming stranded. Disregarding instructions of the navigation device is oftentimes unintended.

It would therefore be desirable and advantageous to provide a method and a device for supporting a driver of a vehicle, in particular a motor vehicle, by means of which the driver can be supported in a simple and flexible manner when the vehicle deviates from the predetermined driving route.

SUMMARY OF THE INVENTION

According to one aspect of the present invention a method for supporting a driver of a vehicle, in particular a motor vehicle, includes guiding the driver with a navigation device of the vehicle from a starting point to a destination via a defined driving route; automatically detecting with the navigation device whether the vehicle has deviated from the defined driving route; when the vehicle has deviated from the defined driving route is detected, determining with the navigation device whether an amount of propulsion energy stored in an energy storage device of the vehicle, in particular an amount of fuel stored in a fuel tank of the vehicle, is sufficient to still reach at least one energy refilling station, in particular a fuel station; and when an energy refilling station can no longer be reached with the vehicle automatically establishing a phone connection with a vehicle external help center with a phone device of the vehicle, prior to the vehicle becoming stranded, or when an energy refilling station can no longer be reached by the vehicle automatically displaying to the driver with a display device of the vehicle prior to the vehicle becoming stranded, that the driver should establish a phone connection with a vehicle external help central In this way the driver is supported in a particularly simple and flexible manner when the vehicle deviates from the predetermined driving route, because now when deviating from the predetermined driving route either a phone connection with the help center by means of the phone device is created or the driver is automatically alerted by means of the display device that the driver should call the help center. Via the phone connection with the help center the driver can for example first be informed by help personnel of the help center that a fuel station can no longer be reached the vehicle. Depending on the actual traffic situation or operating situation of the vehicle, the driver can then be advised by the help personnel how to further proceed. For example the help personnel may suggest to the driver to drive in a fuel saving manner. In addition the help personal can for example guide the driver to a parking lot or to a safe parking space. The help personnel can for example also inform a service partner, who may drive towards the same parking position of the vehicle with an appropriate reserve of fuel. Information regarding the actual traffic situation or operating situation of the vehicle can be provided to the help personnel for example by the driver. The help center can for example be operated by a vehicle manufacturer. The help center can for example be a call center.

According to another advantageous feature of the invention, the vehicle has a warning signal display device, by means of which a warning signal can automatically or autonomously be outputted to the driver when the vehicle needs to drive to the next fuel station on the driving route of the vehicle in order to prevent the vehicle from becoming stranded. By means of such a warning signal display device the driver can be reliably and effectively alerted that he should drive to the next fuel station on the driving route of the vehicle.

According to another advantageous feature of the invention, the navigation device can detect whether, after outputting the warning signal, the vehicle is or has been driven to the next fuel station on the driving route of the vehicle, wherein when after the outputting of the warning signal the vehicle has not been driven to next fuel station on the driving route of the vehicle, the navigation device automatically or autonomously determines whether the vehicle is still capable of reaching at least one fuel station. When a fuel station can no longer be reached, a phone connection with the help center is again automatically established or it is automatically displayed with the display device that the driver should establish a phone connection with the help center. The warning signal can hereby be an acoustic and/or an optical signal.

According to another advantageous feature of the invention, when a phone connection with the help center is generated, vehicle data are transmitted to the help center, in particular automatically, with a data transmission device of the vehicle. This allows reliably and with high accuracy informing consulting personnel of the help center regarding the actual operating situation of the vehicle.

According to another advantageous feature of the invention, the vehicle data include data regarding the actual position of the vehicle and/or data regarding the average amount of propulsion energy consumed by the vehicle and/or data regarding the amount of propulsion energy stored in the energy storage device of the vehicle and/or data regarding the actual, in particular electrical, energy consumption of the vehicle. Such data are particularly relevant for the help personnel of the help center when the vehicle is at risk of becoming stranded.

According to another advantageous feature of the invention, the vehicle has at least one energy setting device by means of which the energy consumption, in particular the electrical energy consumption, of the vehicle can be set and/or changed, wherein when data regarding the actual energy consumption of the vehicle are transmitted to the help center the energy setting device of the vehicle is controlled by means of a control and/or regulation device of the help center. Such a regulation and/or control device allows setting or changing the energy consumption of the vehicle particularly comfortably and effectively. By means of the energy setting device for example the energy for operating certain energy consumers of the vehicle, for example an air conditioning system and/or a seat heating of the vehicle, can be reduced when this increases the range of the vehicle.

According to another advantageous feature of the invention, the help center includes a data transmission device, which can be brought in signal communication with the navigation device of the vehicle, by means of which data transmission device, when a phone connection with the help central is established, location data regarding the location of at least one parking lot that is still reachable by the vehicle are transmitted, in particular automatically, to the navigation device of the vehicle. By means of such a data transmission device the driver of the vehicle can be comfortably and reliably guided by the navigation device to a parking lot that can still be reached by the vehicle.

According to another advantageous feature of the invention, when an energy filling station can no longer be reached by the vehicle a warning signal is outputted, in particular automatically, by a warning signal sending device of the vehicle to at least some vehicles located in the vicinity of the vehicle prior to the vehicle becoming stranded. Preferably the warning signal is outputted to at least some of the vehicles that are located at a distance of less than a defined distance value, preferably less than 5 km, to the vehicle. In this way vehicles that are located in the immediate vicinity of the vehicle that has deviated from the driving route, can be warned early of a potentially stranded vehicle. Preferably in addition those vehicles are warned which in relation to the driving direction are located behind the vehicle that has deviated from the driving route. The warning signal can be transmitted for example by means of Car2x communication.

The term Car2x is an umbrella term for different transmission technologies. Depending on the transmission technology different ranges can be achieved. In addition it is possible to forward the information by Car2x-enabled vehicles by so-called hopping. In the transmission of Car2x events (an event is hereby for example a stranded vehicle that has deviated from the driving route) a relevance region can also be transmitted beside the pure information of the event, for example a circle with a radius of 5 km. This informs Car2x-enabled vehicles how far the information has to be forwarded and the receiving vehicles also know whether this information is relevant for them and thus a warning to the driver may be appropriate. An event is hereby usually particularly relevant the closer the event is.

According to another advantageous feature of the invention, the determining whether the amount of propulsion energy stored in the energy storage device of the vehicle is sufficient to still reach at least one energy refilling station is performed as a function of at lest one item of data selected from the group consisting of data regarding an average propulsion energy consumption of the vehicle, data regarding an amount of propulsion energy stored in the energy storage device of the vehicle, data regarding an actual traffic situation of the vehicle, road data, and data regarding an actual position of the vehicle. By means of such data it can be reliably and highly accurately determined whether the amount of propulsion energy stored in the energy storage device of the vehicle is sufficient to still reach at least one energy refilling station. The data regarding the actual traffic situation of the vehicle can hereby for example be traffic jam data and/or data regarding the traffic network.

According to another advantageous feature of the invention, the driving route is set and/or determined so that when staying on the driving route at least one energy refilling station can still be reached with the vehicle.

According to another advantageous feature of the invention, when an energy refilling station can no longer be reached the driver is informed, in particular automatically, by an information device of the vehicle prior to the automatic generation of the phone connection by means of the phone of the vehicle, that an energy refilling station can no longer be reached with the vehicle. This reliably and quickly informs the driver that the vehicle is at risk of becoming stranded. The driver can then for example be acoustically and/or visually informed.

According to another aspect of the invention feature of the invention, a device for supporting a driver of a vehicle, in particular a motor vehicle, includes a navigation device, a phone device, a display device, and a vehicle-external help center, wherein the navigation device is configured to guide the driver from a starting point to a destination via a defined driving route, to automatically detect a deviation of the vehicle from the defined driving route, and to determine whether an amount of propulsion energy stored in an energy storage device of the vehicle, in particular an amount of fuel stored in a fuel tank of the vehicle, is sufficient to still reach at least one energy refilling station, in particular a fuel station. When an energy refilling station can no longer be reached with the vehicle, the phone device, prior to the vehicle becoming stranded, automatically establishes a phone connection with a vehicle external help center, or the display device, prior to the vehicle becoming stranded, automatically displays to the driver to establish a phone connection with a vehicle external help center.

According to another aspect of the invention, a vehicle, in particular a motor vehicle, includes a navigation device, a phone device and a display device, wherein the navigation device is configured to guide the driver from a starting point to a destination via a defined driving route, to automatically detect a deviation of the vehicle from the defined driving route, and to determine whether an amount of propulsion energy stored in an energy storage device of the vehicle, in particular an amount of fuel stored in a fuel tank of the vehicle, is sufficient to still reach at least one energy refilling station, in particular a fuel station. When an energy refilling station can no longer be reached with the vehicle, the phone device, prior to the vehicle becoming stranded, automatically establishes a phone connection with a vehicle external help center, or the display device, prior to the vehicle becoming stranded, automatically displays to the driver to establish a phone connection with a vehicle-external help center.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
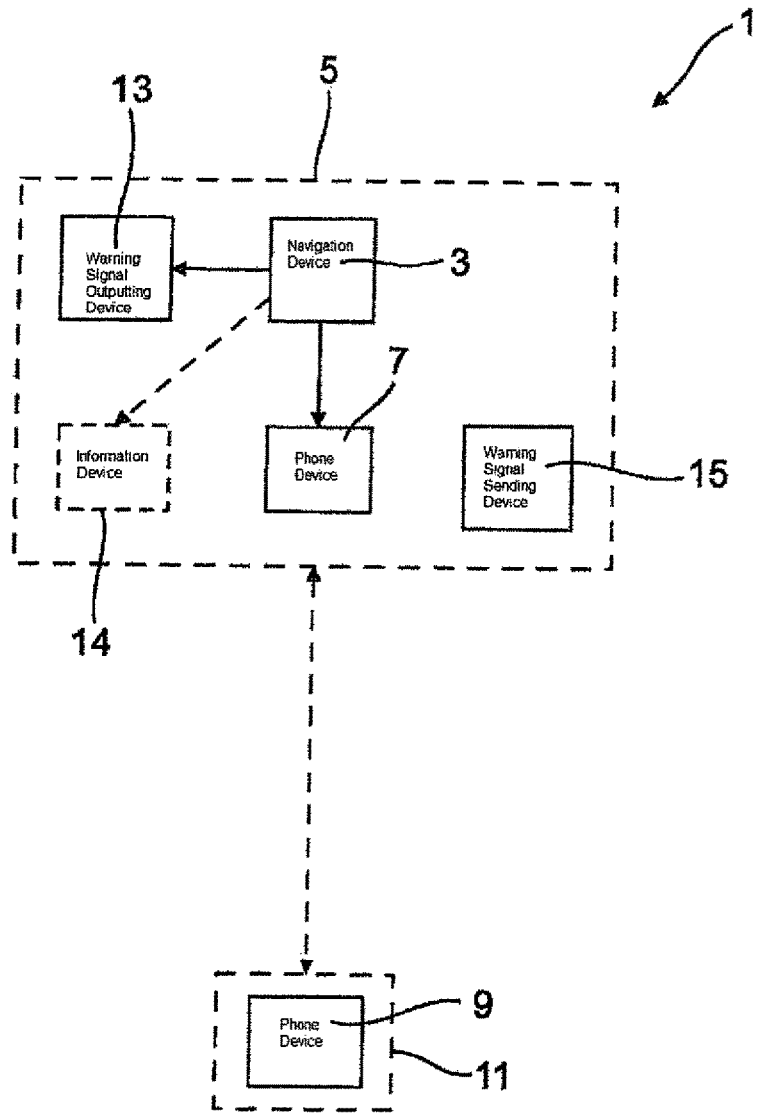
FIG. 1 shows a schematic representation of a first embodiment of a device according to the invention.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a first embodiment of the device 1 according to the invention. The device 1 includes a navigation device 3, which is provided on a vehicle 5 indicated in FIG. 1 with dashed lines. By means of the navigation device 3 a driver of the vehicle 5 can be guided from a starting point over a defined driving route to a destination. The driving route is here set or determined by means of the navigation device 3 so that when adhering to the driving route at least one energy refilling station, for example a fuel station, can still be reached by the vehicle 5. The navigation device 3 can also automatically or autonomously detect a deviation of the vehicle 5 from the driving route.

The vehicle 5 for example also has a warning signal output device 13 which is in signal communication with the navigation device 3, and by means of which a warning signal can be autonomously or automatically outputted to the driver, when the vehicle has to be driven to next energy refilling station in order to prevent the vehicle 5 from becoming stranded. By means of the navigation device 3 it can also be detected whether, after outputting the warning signal, the vehicle is or was driven to the next fuel station on the route of the vehicle 5.

As further shown in FIG. 1 the vehicle 5 may also have a warning signal sending device 15 which can be operated by the driver of the vehicle 5, and when operated outputs a warning signal to vehicles that are located in driving direction behind the vehicle 5 on the driving route on which the vehicle 5 drives and are located at a distance to the vehicle 5 of less than a defined distance value. By means of the warning signal the vehicles behind the vehicle 5 are warned of the stranding of the vehicle 5. Preferably the defined distance value is 5 km.

Data available to the navigation device 3 also include for example data regarding the average propulsion energy consumption of the vehicle 5, data regarding the amount of propulsion energy stored in the energy storage device of the vehicle 5, data regarding the actual traffic situation of the vehicle 5, road data and data regarding the actual position of the vehicle 5.

Figure 2:
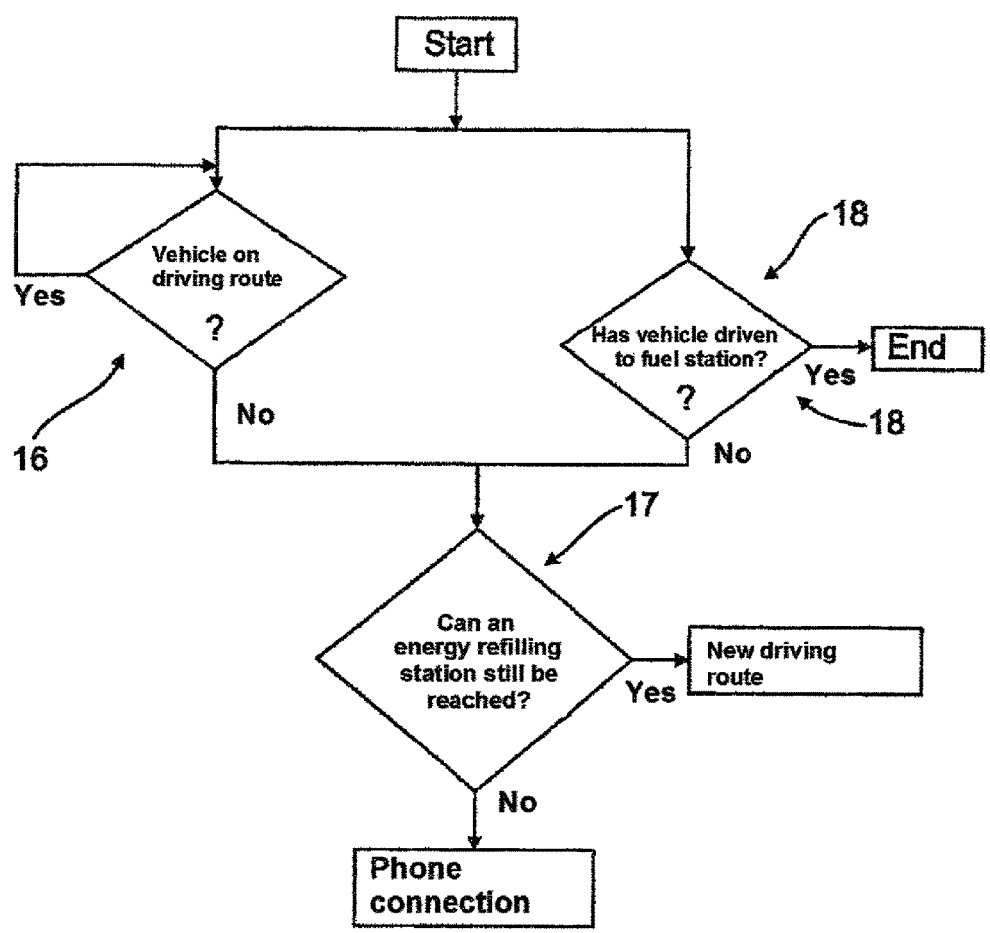
FIG. 2 shows schematic representation of the method according to the invention with the first embodiment of the device.

In the following an exemplary sequence of the method according to the invention is explained with reference to FIG. 2:

After the start of the vehicle navigation the navigation device 3 tests in a step 16 whether or not the vehicle 5 is located on a driving route determined by means of the navigation device 3. When the navigation device 3 determines that the vehicle 5 has deviated from the driving route, the navigation device 3 determines in a step 17 whether the amount of propulsion energy for driving the vehicle stored in an energy storage device of the vehicle 5 is sufficient to still reach at least one energy refilling station. When an energy refilling station can longer be reached with the vehicle 5 a phone connection with a phone device 9 of a help center 11, which in FIG. 1 is indicated with dashed lines, is automatically or autonomously established by means of a phone device 7 (FIG. 1) of the vehicle, which is in signal communication with the navigation device 3. The phone connection can hereby for example be established by means of a radio connection.

After establishing the phone connection the help personnel of the help center 11 then advises the driver how to further proceed. The driver can also be advised by the help personnel of the help center 11 to actuate the warning signal sending device 15 of the vehicle 5. When in step 17 it is determined by means of the navigation device 3 that an energy refilling station can still be reached by the vehicle 5 the navigation device 3 for example in this case determines a new driving route. The new driving route has the still reachable energy refilling station as destination.

When a warning signal was already outputted to the driver of the vehicle 5, the navigation device 3 tests in parallel to step 16 in a step 18 whether or not after outputting the warning signal the vehicle 5 is driven to the next energy refilling station on the route of the vehicle 5. When the vehicle 5 is not driven to the next energy refilling station on the driving route of the vehicle 5 the navigation device 3 also automatically performs step 17.

Optionally, by means of an information device 14 (FIG. 1) of the vehicle which is in signal communication with the navigation device 3, the driver can be automatically or autonomously informed prior to the automatic establishment of the phone connection via the vehicle's phone device 7 that an energy refilling station can no longer be reached with the vehicle.

Figure 3:
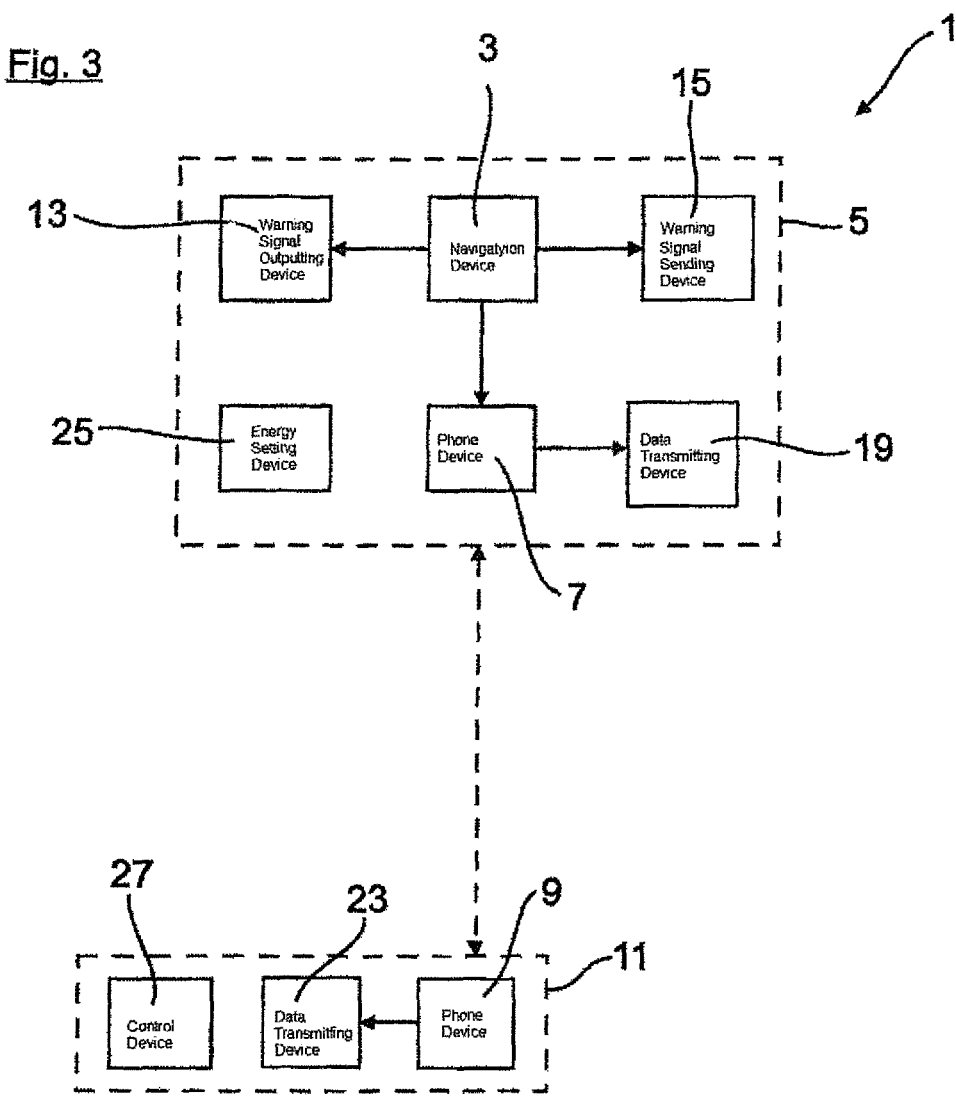
FIG. 3 shows a representation according to FIG. 1 of a second embodiment of the device according to the invention.
Figure 4:
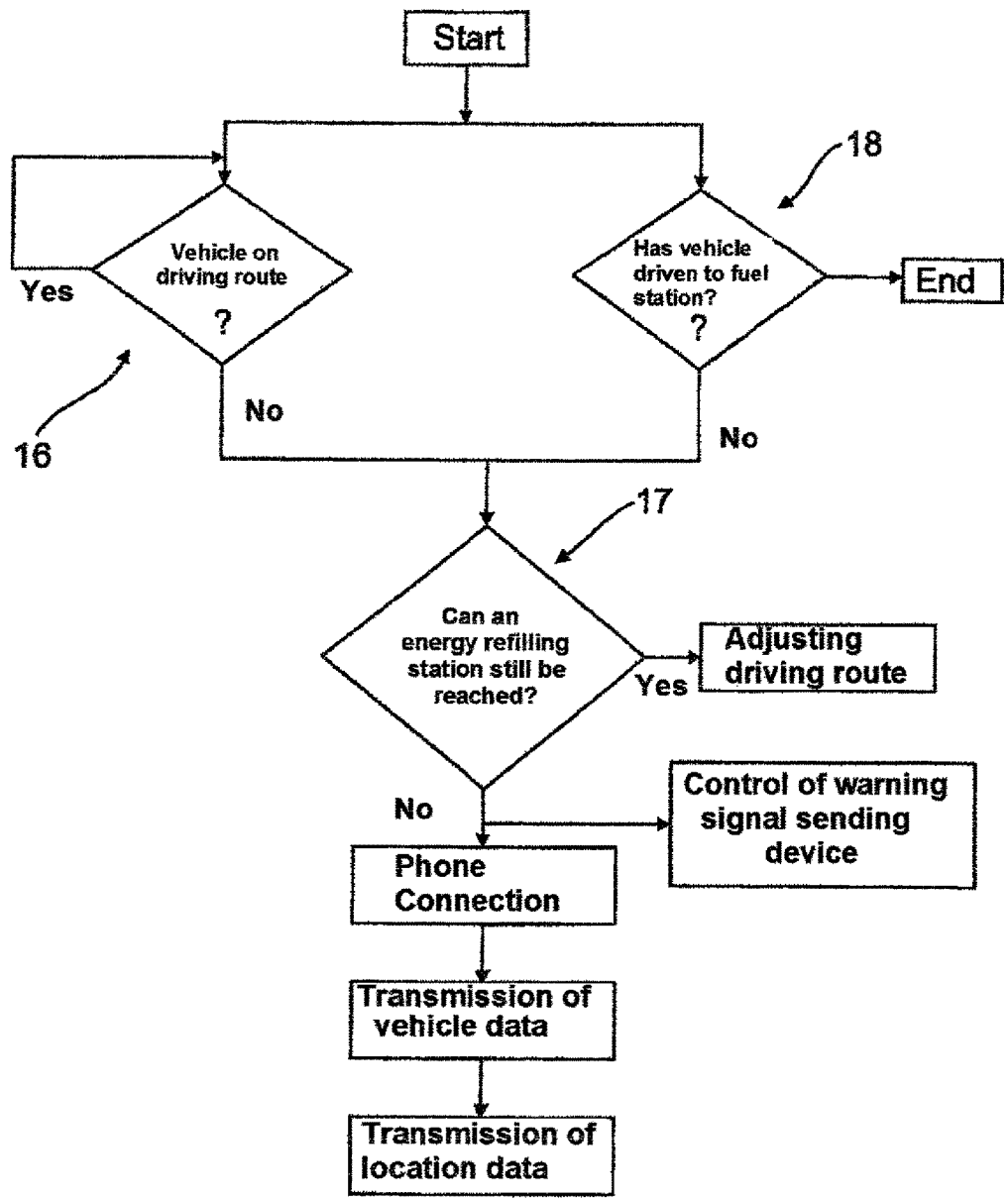
FIG. 4 shows a representation of the method according to the invention according to FIG. 2 with the second embodiment of the invention.

FIG. 3 shows a second embodiment of the device 1. In contrast to the first embodiment of the device 1 shown in FIG. 1 the warning signal sending device 15 is in signal communication with the navigation device 3. As shown in FIG. 4, the warning signal sending device 15 is automatically or autonomously controlled by the navigation device 3, when it is determined in step 17 that an energy refilling station can no longer be reached with the vehicle 5. As a result of this control the warning signal is transmitted to the vehicles in the vicinity of the vehicle 5 by means of the warning signal sending device 15.

As shown in FIG. 3 in the second embodiment of the device 1 the vehicle also includes a data transmission device 19, which is in signal communication with the phone device 7. By means of this data transmission device 19 vehicle data are automatically transmitted to the help center 11 after establishing the phone connection between the vehicle 5 and the help center 11. The vehicle data include for example data regarding the actual position of the vehicle 5, data regarding the average consumption of propulsion energy by the vehicle 5, data regarding the amount of propulsion energy stored in the energy storage device of the vehicle 5, and data regarding the actual energy consumption of the vehicle 5.

The data transmission between the vehicle 1 and the help center 11 can also be accomplished by means of a UMTS-connection or an LTE connection.

The help center 11 of the second embodiment of the device 1 also has a data transmission device 23, which is in signal communication with the phone device 9 and by means of which data transmission device, after establishing the phone connection between the vehicle 5 and the help center 11, location data regarding a location of a parking lot that can still be reached by the vehicle 5 are transmitted to the navigation device 3. In the present example the parking lot that can still be reached is automatically set as the new destination by means of the navigation device 3. In this way the driver of the vehicle 5 can be guided to the still reachable parking lot by the navigation device 3 in a particularly reliable and comfortable manner.

The vehicle 5 of the second embodiment of the device 1 also has an energy setting device 25, by means of which the electric energy consumption of the vehicle 5 can be set or changed. After transmission of the data regarding the actual energy consumption of the vehicle 5 to the help center 11, the energy setting device 25 is regulated or controlled by a regulation and/or control device 27 of the help center 11. The energy setting device 25 can hereby for example be controlled by the help personnel of the help center 11. As an alternative it is also conceivable to automatically control or regulate the energy setting device 25 by means of the regulation and/or control device 27.

Figure 5:
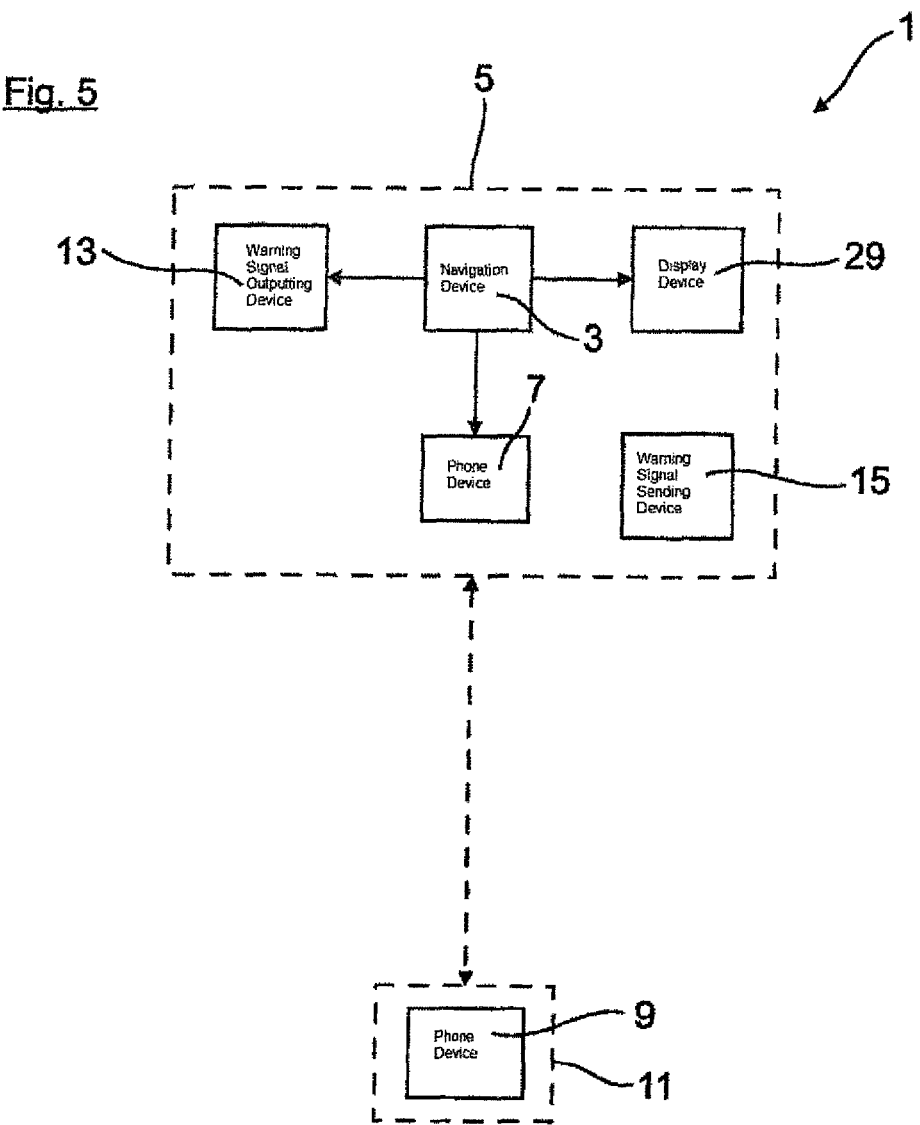
FIG. 5 shows a representation according to FIG. 1 a third embodiment of the device.
Figure 6:
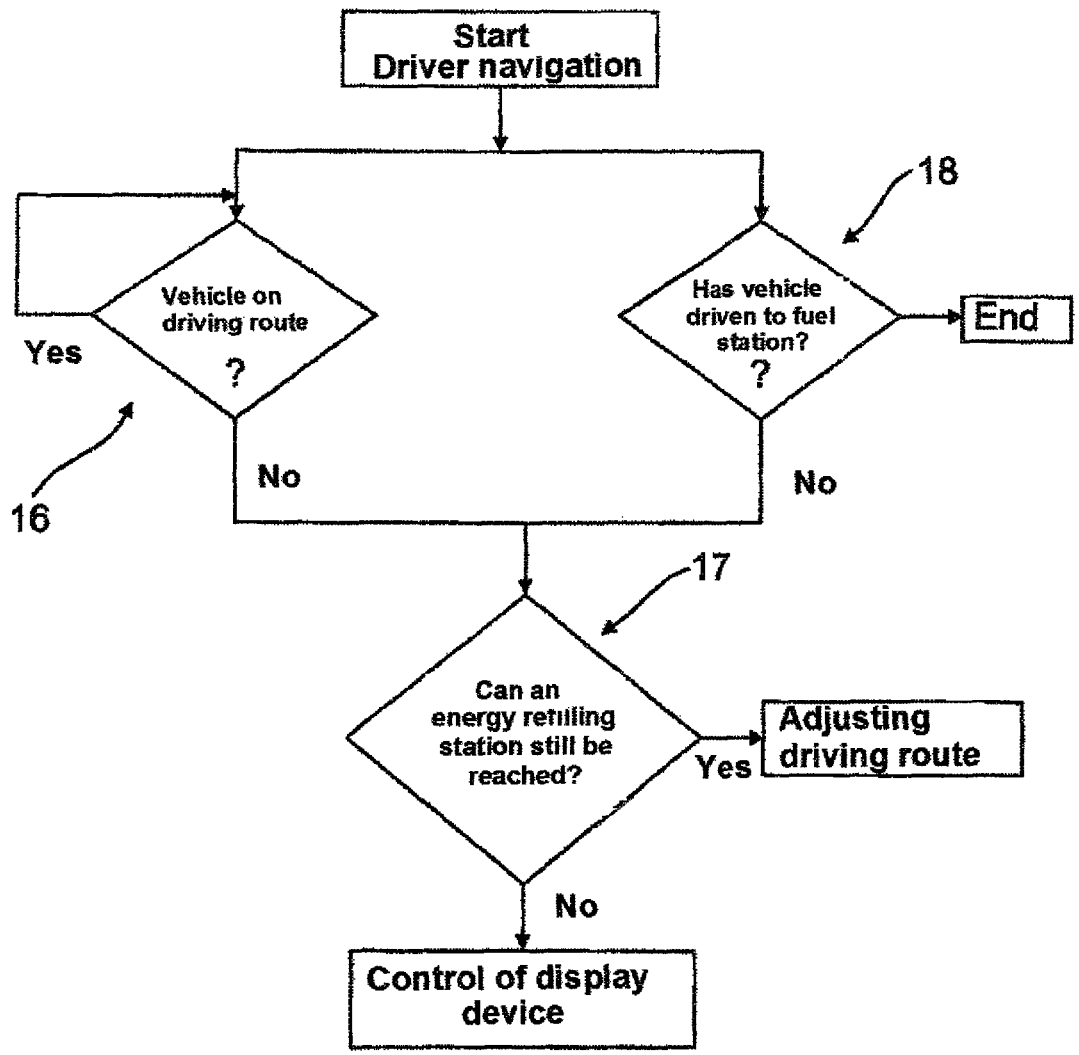
FIG. 6 shows a representation the method according to the invention according to FIG. 2 with the third embodiment of the device according.

FIG. 5 shows a third embodiment of the device 1. In contrast to the first embodiment shown in FIG. 1 in the third embodiment of the device 1 the vehicle has a display device 29, which is in signal communication with the navigation device, for example a monitor. The display device 29 in this case is controlled automatically or autonomously by means of the navigation device 3, when it is determined in step 17 that an energy refilling station can no longer be reached with the vehicle 5. As a result of this control it is displayed to the driver by means of the display device 29 that the driver should establish a phone connection with the help center 11. In addition the navigation device 3 in this case is also in signal communication with the phone device 7. The phone connection between the vehicle 5 and the help center 11 is in this case not established automatically or autonomously but rather by the driver of the vehicle 5. By means of the display device 29 it can for example be displayed "call the help center".

What is claimed as new and desired to be protected by Letters Patent is set forth in the appended claims and includes equivalents of the elements recited therein:

1. A method for supporting a driver of a vehicle, comprising:

guiding the driver with a navigation device of the vehicle from a starting point to a destination via a defined driving route;

automatically detecting with the navigation device whether the vehicle has deviated from the defined driving route;

when it is detected that the vehicle has deviated from the defined driving route, determining with the navigation device whether an amount of propulsion energy stored in an energy storage device of the vehicle is sufficient to still reach at least one energy refilling station;

when an energy refilling station can no longer be reached by the vehicle, automatically establishing a phone connection with a vehicle-external help center with a phone device of the vehicle, prior to the vehicle becoming stranded, or when an energy refilling station can no longer be reached by the vehicle, automatically displaying to the driver with a display device of the vehicle prior to the vehicle becoming stranded, a signal that the driver should establish a phone connection with a vehicle-external help center;

when a phone connection with the vehicle-external help center is established, transmitting vehicle data with a data transmitting device of the vehicle to the vehicle-external help center, wherein the vehicle data include at least one member selected from the group consisting of data regarding the actual position of the vehicle, data regarding the average propulsion energy consumption of the vehicle, data regarding an amount of propulsion energy stored in the energy storage device of the vehicle, and data regarding an actual energy consumption of the vehicle; and in response to transmission of data regarding the actual energy consumption of the vehicle to the vehicle-external help center, controlling by the vehicle-external help center with a control device at least one energy setting device of the vehicle with which an energy consumption of the vehicle can be set and/or changed.

2. The method of claim 1, further comprising outputting a warning signal to the driver with a warning signal outputting device of the vehicle, when the vehicle has to be driven to the next energy refilling station on the driving route of the vehicle to prevent the vehicle from becoming stranded.

3. The method of claim 2, further comprising detecting with the navigation device whether after outputting the warning signal the vehicle was driven to the next energy refilling station on the route of the vehicle, wherein when after outputting of the warning signal, the vehicle was not driven to the next refilling station on the driving route of the vehicle, automatically determining with the navigation device whether at least one energy refilling station can still be reached by the vehicle.

4. The method of claim 1, further comprising when a phone connection with the vehicle-external help center is established, transmitting to the navigation device of the vehicle with a data transmitting device of the vehicle-external help center data regarding a location of at least one parking lot that can still be reached by the vehicle.

5. The method of claim 1, wherein the determining whether the amount of propulsion energy stored in the energy storage device of the vehicle is sufficient to still reach at least one energy refilling station is performed as a function of at least one item of data selected from the group consisting of data regarding an average propulsion energy consumption of the vehicle, data regarding an amount of propulsion energy stored in the energy storage device of the vehicle, data regarding an actual traffic situation of the vehicle, road data, and data regarding an actual position of the vehicle.

6. The method of claim 1, further comprising setting and/or determining the driving route with the navigation device so that when following the driving route at least one energy refilling station can still be reached by the vehicle.

7. A method for supporting a driver of a vehicle, comprising:
    guiding the driver with a navigation device of the vehicle from a starting point to a destination via a defined driving route;
    automatically detecting with the navigation device whether the vehicle has deviated from the defined driving route;
    when it is detected that the vehicle has deviated from the defined driving route, determining with the navigation device whether an amount of propulsion energy stored in an energy storage device of the vehicle is sufficient to still reach at least one energy refilling station;
    when an energy refilling station can no longer be reached by the vehicle automatically, establishing a phone connection with a vehicle-external help center with a phone device of the vehicle, prior to the vehicle becoming stranded, or
    when an energy refilling station can no longer be reached by the vehicle, automatically displaying to the driver with a display device of the vehicle prior to the vehicle becoming stranded, a signal that the driver should establish a phone connection with a vehicle-external help center; and
    when an energy refilling station can no longer be reached by the vehicle, outputting a warning signal to vehicles in a vicinity of the vehicle with a warning signal outputting device of the vehicle, prior to the vehicle becoming stranded.

8. The method of claim 7, further comprising when a phone connection with the vehicle-external help center is established transmitting vehicle data with a data transmitting device of the vehicle to the vehicle-external help center.

9. The method of claim 8, wherein the vehicle data include at least one member selected from the group consisting of data regarding the actual position of the vehicle, data regarding the average propulsion energy consumption of the vehicle, data regarding an amount of propulsion energy stored in the energy storage device of the vehicle, and data regarding an actual energy consumption of the vehicle.

10. The method of claim 7, further comprising outputting a warning signal to the driver with a warning signal outputting device of the vehicle, when the vehicle has to be driven to the next energy refilling station on the driving route of the vehicle to prevent the vehicle from becoming stranded.

11. The method of claim 10, further comprising detecting with the navigation device whether after outputting the warning signal the vehicle was driven to the next energy refilling station on the route of vehicle, wherein when after outputting of the warning signal, the vehicle was not driven to the next refilling station on the driving route of the vehicle, automatically determining with the navigation device whether at least one energy refilling station can still be reached by the vehicle.

12. The method of claim 7, further comprising when a phone connection with the vehicle-external help center is established, transmitting to the navigation device of the vehicle with a data transmitting device of the vehicle-external help center data regarding a location of at least one parking lot that can still be reached by the vehicle.

13. The method of claim 7, wherein the determining whether the amount of propulsion energy stored in the energy storage device of the vehicle is sufficient to still reach at least one energy refilling station is performed as a function of at least one item of data selected from the group consisting of data regarding an average propulsion energy consumption of the vehicle, data regarding an amount of propulsion energy stored in the energy storage device of the vehicle, data regarding an actual traffic situation of the vehicle, road data, and data regarding an actual position of the vehicle.

14. The method of claim 1, further comprising setting and/or determining the driving route with the navigation device so that when following the driving route at least one energy refilling station can still be reached by the vehicle.

15. A device for supporting a driver of a vehicle, in particular a motor vehicle said device comprising:
    a navigation device, a phone device, a display device, a data transmitting device, a control device, an energy setting device and a vehicle-external help center,
    said navigation device being configured to guide the driver from a starting point to a destination via a defined driving route, to automatically detect a deviation of the vehicle from the defined driving route, and to determine whether an amount of propulsion energy stored in an energy storage device of the vehicle, in particular an amount of fuel stored in a fuel tank of the vehicle, is sufficient to still reach at least one energy refilling station, in particular a fuel station;
    when an energy refilling station can no longer be reached by the vehicle, said phone device, prior to the vehicle becoming stranded, being configured to automatically establish a phone connection with a vehicle-external help center;
    when a phone connection with the vehicle-external help center is established, said data transmitting device being configured to transmit vehicle data to the vehicle-external help center, wherein the vehicle data include at least one member selected from the group consisting of data regarding the actual position of the vehicle, data regarding the average propulsion energy consumption of the vehicle, data regarding an amount of propulsion energy stored in the energy storage device of the vehicle, and data regarding an actual energy consumption of the vehicle; or
    said display device, prior to the vehicle becoming stranded, being configured to automatically display to the driver a signal to establish a phone connection with the vehicle-external help center,
    said control device, in response to the transmission of data regarding the actual energy consumption of the vehicle to the vehicle-external help center, being configured to control by the vehicle-external help center the energy setting device of the vehicle with which an energy consumption of the vehicle can be set and/or changed.

16. A device for supporting a driver of a vehicle, in particular a motor vehicle said device comprising:
    a navigation device, a phone device, a display device, a warning signal outputting device and a vehicle-external help center,
    said navigation device being configured to guide the driver from a starting point to a destination via a defined driving route, to automatically detect a deviation of the vehicle from the defined driving route, and to determine whether an amount of propulsion energy stored in an energy storage device of the vehicle, in particular an amount of fuel stored in a fuel tank of the vehicle, is sufficient to still reach at least one energy refilling station, in particular a fuel station;
when an energy refilling station can no longer be reached by the vehicle, said phone device, prior to the vehicle becoming stranded, being configured to automatically establish a phone connection with a vehicle-external help center, or
said display device, prior to the vehicle becoming stranded, being configured to automatically display to the driver a signal to establish a phone connection with the vehicle-external help center;
said warning signal outputting device, when an energy refilling station can no longer be reached by the vehicle, being configured to output a warning signal to vehicles in a vicinity of the vehicle, prior to the vehicle becoming stranded.

17. A motor vehicle comprising:
a navigation device, a phone device, a data transmitting device, a control device, an energy setting device and a display device,
said navigation device being configured to guide the driver from a starting point to a destination via a defined driving route, to automatically detect a deviation of the vehicle from the defined driving route, and to determine whether an amount of propulsion energy stored in an energy storage device of the vehicle, in particular an amount of fuel stored in a fuel tank of the vehicle, is sufficient to still reach at least one energy refilling station, in particular a fuel station,
when an energy refilling station can no longer be reached by the vehicle, said phone device, prior to the vehicle becoming stranded, being configured to automatically establish a phone connection with a vehicle-external help center;
when a phone connection with the vehicle-external help center is established, said data transmitting device being configured to transmit vehicle data to the vehicle-external help center, wherein the vehicle data include at least one member selected from the group consisting of data regarding the actual position of the vehicle, data regarding the average propulsion energy consumption of the vehicle, data regarding an amount of propulsion energy stored in the energy storage device of the vehicle, and data regarding an actual energy consumption of the vehicle; or
said display device, prior to the vehicle becoming stranded, being configured to automatically display a signal to the driver to establish a phone connection with a vehicle-external help center;
said control device, in response to the transmission of data regarding the actual energy consumption of the vehicle to the vehicle-external help center, being configured to control by the vehicle-external help center the energy setting device of the vehicle with which an energy consumption of the vehicle can be set and/or changed.

18. A motor vehicle comprising:
a navigation device, a phone device, a warning signal outputting device and a display device,
said navigation device being configured to guide the driver from a starting point to a destination via a defined driving route, to automatically detect a deviation of the vehicle from the defined driving route, and to determine whether an amount of propulsion energy stored in an energy storage device of the vehicle, in particular an amount of fuel stored in a fuel tank of the vehicle, is sufficient to still reach at least one energy refilling station, in particular a fuel station,
when an energy refilling station can no longer be reached by the vehicle, said phone device, prior to the vehicle becoming stranded, being configured to automatically establish a phone connection with a vehicle-external help center; or
said display device, prior to the vehicle becoming stranded, configured to automatically display a signal to the driver to establish a phone connection with a vehicle-external help center;
said warning signal outputting device, when an energy refilling station can no longer be reached by the vehicle, being configured to output a warning signal to vehicles in a vicinity of the vehicle, prior to the vehicle becoming stranded.

* * * * *